Sept. 25, 1951
F. L. WHEELER
2,569,082
COLLAPSIBLE HOUSE TRAILER
Filed Feb. 19, 1948
4 Sheets-Sheet 1
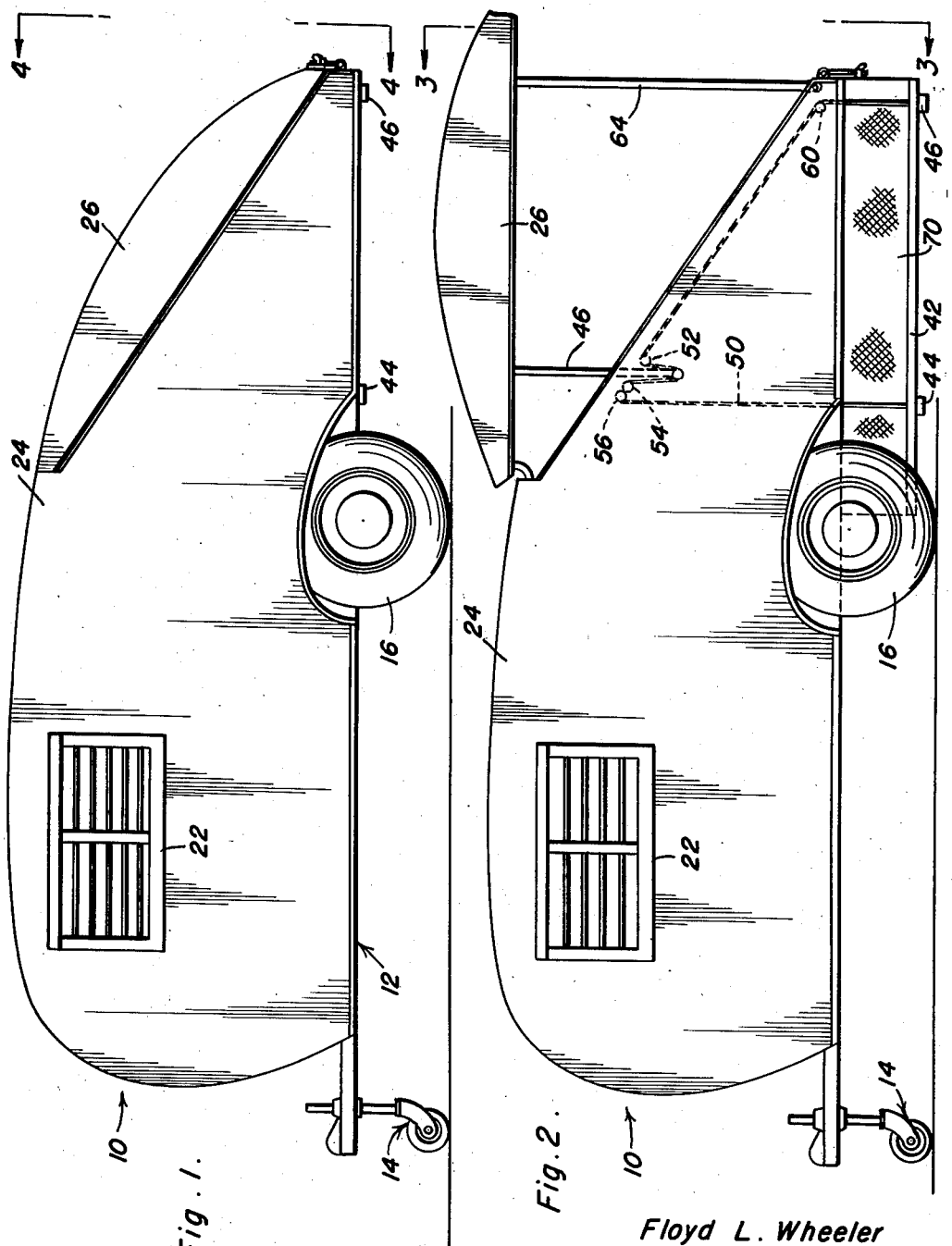
Floyd L. Wheeler
INVENTOR.

Sept. 25, 1951 F. L. WHEELER 2,569,082
COLLAPSIBLE HOUSE TRAILER
Filed Feb. 19, 1948 4 Sheets-Sheet 2

Floyd L. Wheeler
INVENTOR.

Sept. 25, 1951  F. L. WHEELER  2,569,082
COLLAPSIBLE HOUSE TRAILER

Filed Feb. 19, 1948  4 Sheets-Sheet 4

Floyd L. Wheeler
INVENTOR.

BY
Thomas A. O'Brien
and Harvey B. Jacobson
Attorneys

Patented Sept. 25, 1951

2,569,082

UNITED STATES PATENT OFFICE 2,569,082

COLLAPSIBLE HOUSE TRAILER

Floyd L. Wheeler, Fraser, Mich.

Application February 19, 1948, Serial No. 9,567

7 Claims. (Cl. 296—23)

1

This invention appertains to novel and useful improvements in trailers.

An object of this invention is to provide a cabin with a hinged section and a floor in the cabin having a portion thereof removably connected with the said floor.

Another object of this invention is to provide means for simultaneously lowering said portion when said section is raised.

Another object of this invention is to provide improved means for maintaining the section in the selected raised position.

Another object of this invention is to provide a generally improved trailer adapted to be towed or pulled by a conventional vehicle which is economical in utilization of space, attractive in appearance and relatively inexpensive to manufacture.

Other objects and features of novelty will become apparent to those skilled in the art, in following the description of a preferred form of the invention, illustrated in the accompanying drawings, wherein:

Figure 1 is an elevational side view of the invention;

Figure 2 is an elevational side view showing portions in a second position of operation;

Figure 3:
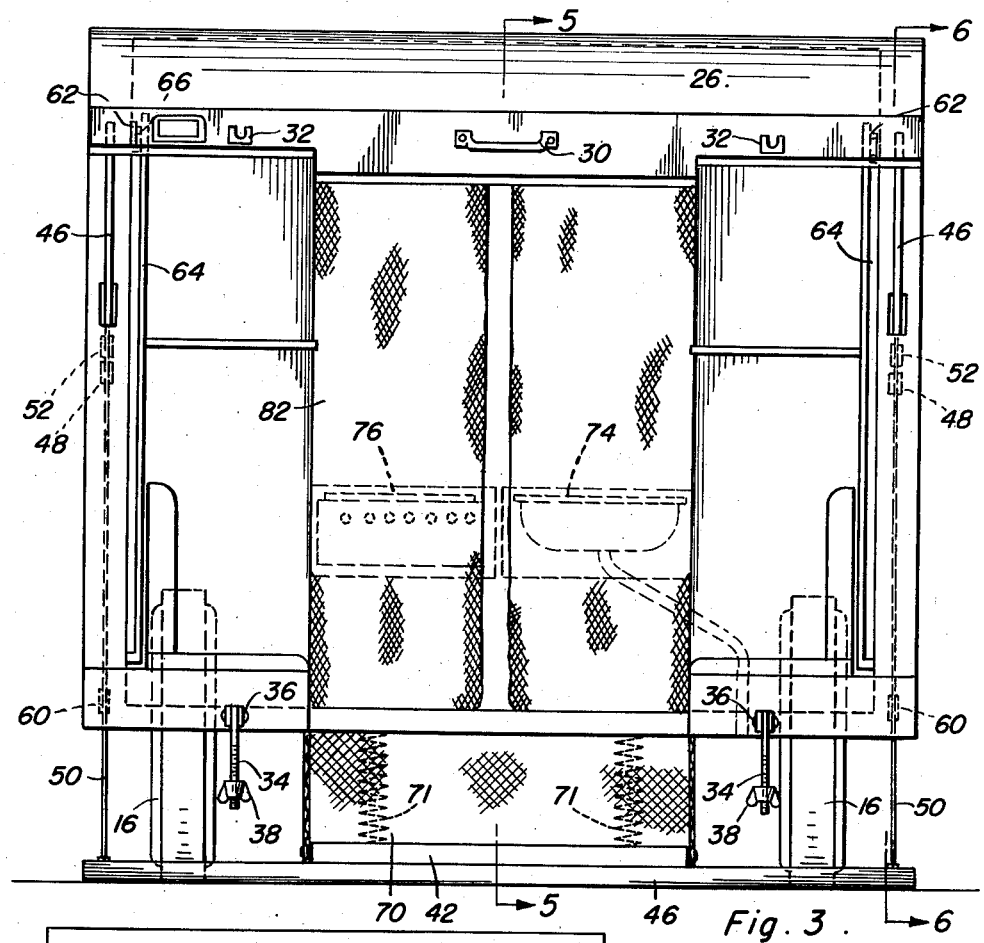
Figure 3 is an end view taken substantially on the line 3—3 of Figure 2 and in the direction of the arrows.
Figure 4:
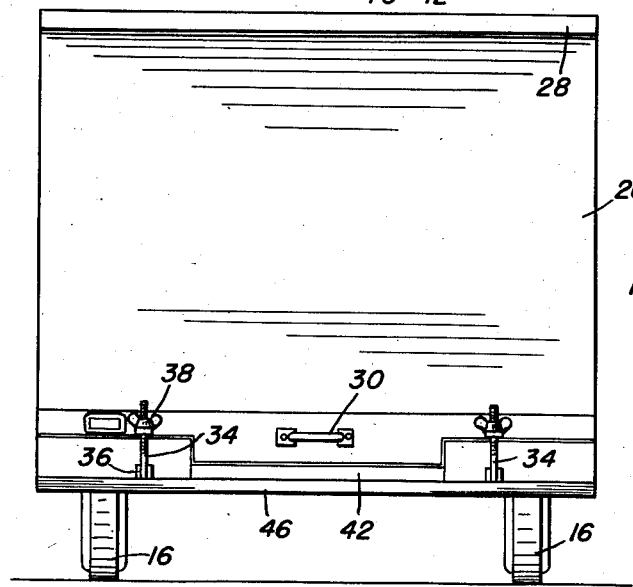
Figure 4 is an end view taken substantially on the line 4—4 of Figure 1 and in the direction of the arrows.

This invention has been developed to provide a device for more efficacious camping and travel. There are numerous features of importance incorporated in the present invention, characterized by the following structure:

A trailer generally indicated at 10 is provided with an undercarriage framework 12 having a castor assembly 14 attached at one end thereof by any suitable means. A pair of wheels 16 are supplied in association with a conventional axle 18, which is in turn attached to the trailer 10 by means of conventional springs 20. It will be noted at this point that any materials of construction may be utilized in the said trailer 10 such as light metal, wood framing with a waterproof cover, plyboard or any others. This is but a matter of choice of materials left within the prerogative of the manufacturer.

A window plate 22 may be supplied in the said trailer where it is deemed desirable to serve the usual purpose of admitting light and air to the interior of the trailer and, more specifically, to the interior of the cabin thereof.

The said cabin 24 is provided with a section 26 forming a portion of the roof of the cabin 24 and forming substantially the entire back thereof. This section is connected by any suitable, convention hinge and has a water or moisture seal 28 extending across the said cabin at the junction of the portion 26.

A handle 30 may be secured to the said portion 26 for lifting purposes and a plurality of substantially U-shaped clips 32 may be supplied on the said portion 26 for detachable engagement with a pair of bolts 34. Of course, the said bolts 34 are pivotally secured to the said cabin by means of conventional brackets 36 or the equivalent. The nut 38 supplied on each bolt 34 is supplied for clamping engagement with the U-shaped bracket 32 thereby maintaining the portion 26 in the closed position when found desirable.

The said cabin 24 is provided with a floor 40 having a portion 42 thereof movably associated therewith. This portion 42 may have transverse studs 44 and 46 which are adapted to rest against the ground, if it is found desirable.

Figure 5:
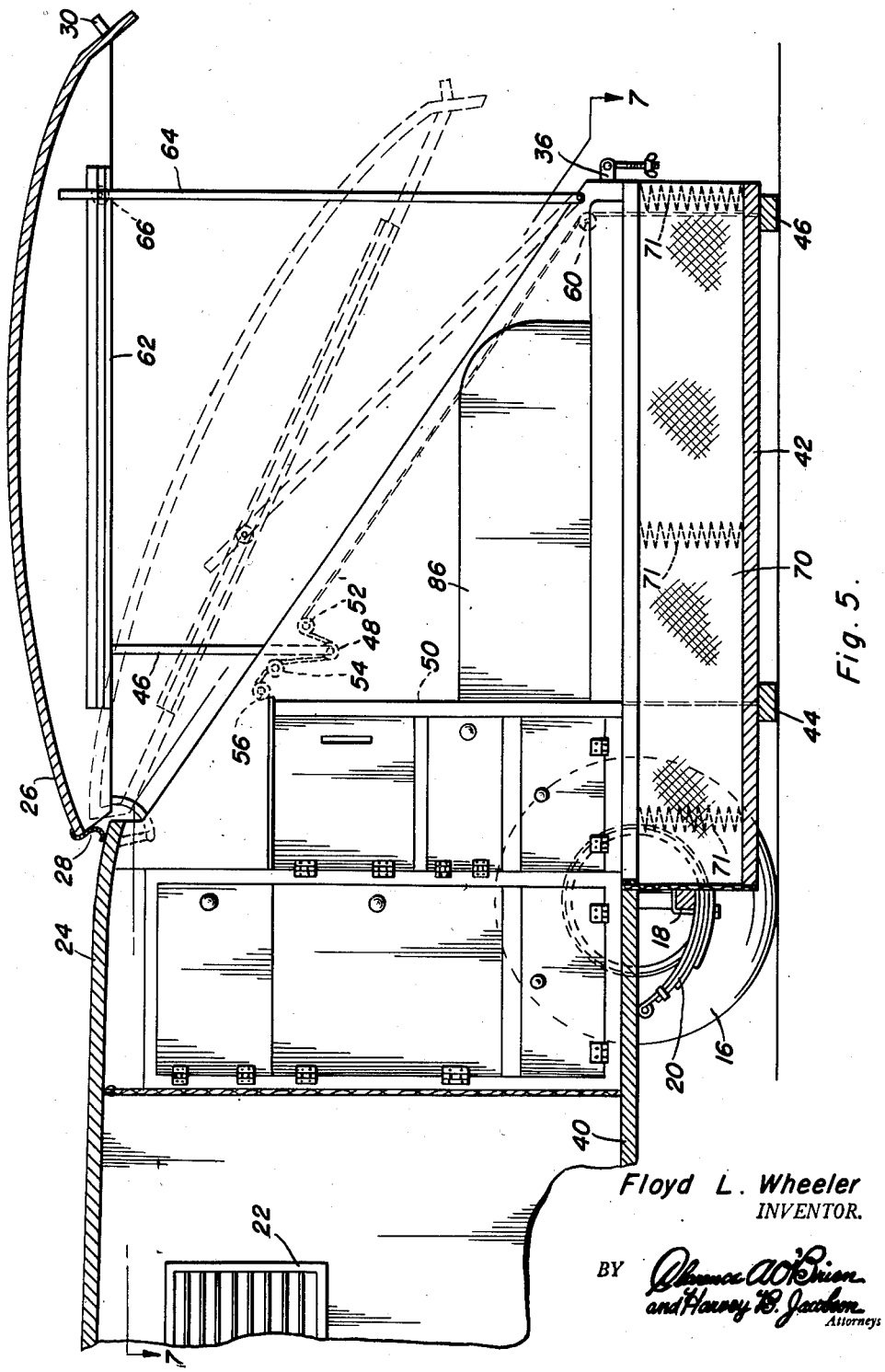
Figure 5 is a sectional view taken on the line 5—5 of Figure 3.
Figures 6, 7:
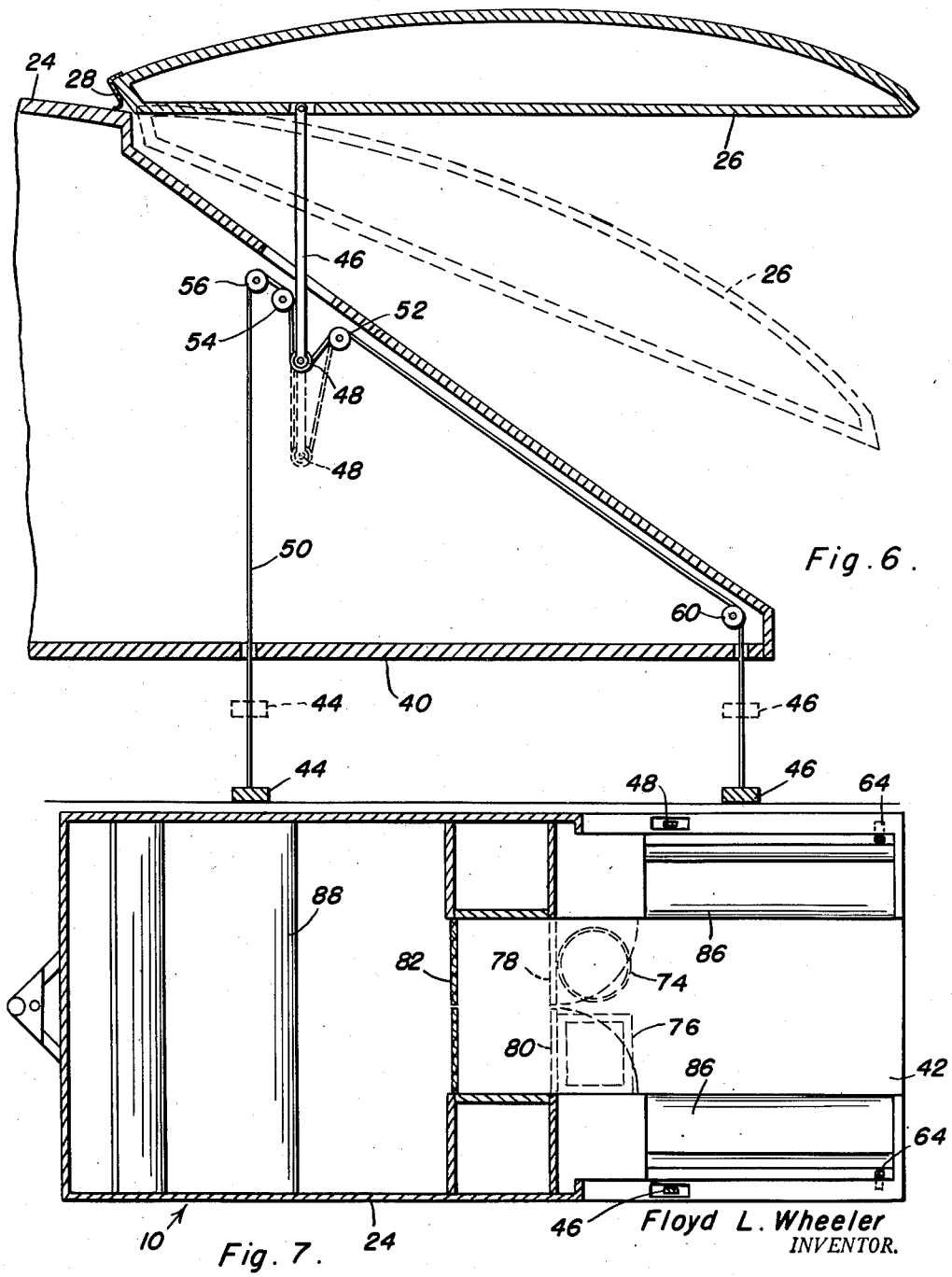
Figure 6 is a sectional view taken on the line 6—6 of Figure 3.
Figure 7 is a sectional view taken substantially on the line 7—7 of Figure 5 and in the direction of the arrows.

Referring to Figure 7 it will be seen that the portion 42 is within the cabin immediately beneath the said section 26. Means for raising the said portion 42 when the section 26 is lowered is supplied. This means may be seen best in Figure 5 as including an arm 46 which is pivotally secured to the said section 26. The terminal portion of the arm 46 is supplied with a roller or pulley 48 in contact with a cable 50. This cable extends over a plurality of guides or pulleys, two of which are indicated at 52 and 54 and which are attached to the said cabin 24 in spaced relation. The said pulley 48 engages the cable between the spaced guides or pulleys 52 and 54.

The said cable 50 extends over the other pulleys 56 and 60 respectively which are spaced from the first-mentioned spaced pair of pulleys 52 and 54. The cable then extends to the lower portion 42 and more specifically to the said studs 44 and 46. It may now be readily appreciated that upon pivotal movement of the said section 26, the cable 50 will be taken up from the space between the said pulleys or guides 52 and 54, thereby raising the lower portion 42.

Means for maintaining the said section 26 in the selected raised position is provided. The preferable means consists of a guide rail 62 attached to the said section 26 having a rod 64 slidably associated therewith. The slidable connection may be made by a pin or shoe 66 which is attached to the rod 64 within the tracks of the said rail 62. The opposite end of the said rod 64 is pivotally attached to the said cabin 24. When the section 26 is raised to a position such that the rod 64 is in a substantially vertical position, the force (weight of the section) will be substantially in alignment with the pivot point of the rod 64, thereby causing the rod to act as a dead center latch.

It is obvious from an inspection of Figure 3 that the simultaneous raising and lowering means as well as the latching or locking means for maintaining the section in the selected raised position, is duplicated, the elements being identical a duplicate description thereof is deemed unnecessary.

In the absence of a special provision, when the lower portion 42 is lowered, an aperture will result. The aforementioned special provision consists of a flexible cover element 70 which is attached to the floor 40 as well as to the said lower portion 42. Any conventional means of attachment may be resorted to in this connection such as tacking or the like. Retaining springs 71 seat on the said portion 42 and are associated with the cover 70 for maintaining it in the selected, desired position. When the portion is raised, the springs 71 act to again maintain the cover 70 in the arranged position, which is desirable.

Referring now to Figure 7 it will be seen that various appurtenances contiguous to trailers such as a sink 74 and stove 76 may be supplied in the trailer beneath the section 26 and adjacent the portion 42. These appurtenances may be swingingly supported on doors 78 and 80 which are attached to partitioning within the trailer and a closure 82 may be supplied therebehind for serving the purpose of a partition for separating sections within the trailer 10. Of course, a window may be supplied in this closure 82, or if it is found desirable, the closure 82 may be obviated for curtain or other suitable element.

Other fixtures such as the benches 86 may be supplied within the trailer 10 and a convertible sofa 88 may be secured within the cabin in an advantageous position. Cabinets and the like may be positioned wherever it is found desirable as well as various other articles. The utility of other conventional elements, embellished with upholstery or the like, may be supplied wherever it is found desirable to supply any degree of comfort within the practical limits of the design, depending upon the final cost of the installation desired in the article.

While there has been described and illustrated but a preferred form of the invention, it is apparent that variations may be made such as re-arrangement of elements, and the addition of various appurtenances to the trailer, without departing from the spirit of the invention. Therefore, limitation is sought only in accordance with the scope of the following claims.

Having thus described the invention, what is claimed as new is:

1. A trailer comprising a cabin having a section which includes a panel hinged at the rear end of the cabin so as to be capable of being raised, a floor in said cabin having a portion movably connected therewith for vertical movement, and means for lowering said portion when said section is raised, said means including an arm pivoted to said panel at a point spaced from its hinge axis so that movement is imparted to said arm upon the panel being raised about the hinge, a pair of spaced guides secured to said cabin, a cable extending over said guides and secured adjacent its ends to said portion, and said arm operatively engaging said cable between said spaced guides for varying the length of said cable between said guides as said section is being raised.

2. A trailer comprising a cabin having a section which includes a panel hinged at the rear end of the cabin so as to be capable of being raised, a floor in said cabin having a portion movably connected therewith for vertical movement, and means for lowering said portion when said section is raised, said means including an arm pivoted to said panel at a point spaced from its hinge axis so that movement is imparted to said panel upon the panel being raised about the hinge, a pair of spaced guides secured to said cabin, a cable extending over said guides and secured adjacent its ends to said portion, said arm operatively engaging said cable between said spaced guides varying the length of said cable between said guides as said section is being raised, and a flexible cover attached to the floor and the cabin to form lower continuations of the sides of the cabin when said portion is lowered.

3. The combination of claim 2 and resilient means associated with said portion forming stiffeners for maintaining said flexible cover in a selected position.

4. The combination of claim 3 and a latch having complemental sections attached to the cabin and said section.

5. The combination of claim 4 and a partition in said cabin separating a portion of the cabin having the hinged section thereon from the remaining portion of said cabin.

6. A trailer comprising a cabin having a section which includes a panel hinged at the rear of the cabin so as to be capable of being raised, a floor in said cabin having a portion movably connected therewith for vertical movement, and means for lowering said portion when said section is raised, said means including an arm pivoted to said panel at a point spaced from its hinge axis so that movement is imparted to said panel upon the panel being raised about the hinge, a pair of spaced guides secured to said cabin, a cable extending over said guides and secured to said portion, said arm operatively engaging said cable between said spaced guides varying the length of said cable between said guides when said section is raised, and extensible means associated with said section and said cabin for supporting said section in a predetermined position.

7. A trailer comprising a cabin having a section which includes a panel hinged at the rear of the cabin so as to be capable of being raised, a floor in said cabin having a portion movably connected therewith for vertical movement, and means for lowering said portion when said section is raised, including an arm pivoted to said panel at a point spaced from its hinge axis so that movement is imparted to said panel upon the panel being raised about the hinge, a pair of spaced guides secured to said cabin, a cable extending over said guides and secured at its ends to said portion, said arm operatively engaging said cable between said spaced guides varying the length of cable between said guides when said section is raised, extensible means associated with said section and said cabin for supporting said section in a predetermined position comprising a rod pivoted at one end to said cabin, and a track secured to said section having the opposite end of said rod slidable therein.

FLOYD L. WHEELER.

REFERENCES CITED

The following references are of record in the file of this patent:

UNITED STATES PATENTS

| Number | Name | Date |
|---|---|---|
| 1,318,994 | Hancock | Oct. 14, 1919 |
| 2,119,154 | Downing | May 31, 1938 |
| 2,167,557 | Stout | July 25, 1939 |
| 2,274,754 | Theisen | Mar. 3, 1942 |
| 2,496,055 | King | Jan. 31, 1950 |

FOREIGN PATENTS

| Number | Country | Date |
|---|---|---|
| 117,965 | Australia | Dec. 23, 1943 |
| 461,624 | Great Britain | Feb. 19, 1937 |
| 539,532 | Germany | Mar. 15, 1930 |
| 701,588 | Germany | Jan. 20, 1941 |